United States Patent [19]
Thorne

[11] 4,221,209
[45] Sep. 9, 1980

[54] SOLAR HEAT EXCHANGE PANEL

[76] Inventor: Nathan J. Thorne, P.O. Box 354, Saugerties, N.Y. 12477

[21] Appl. No.: 899,072

[22] Filed: Apr. 24, 1978

Related U.S. Application Data

[63] Continuation-in-part of Ser. No. 775,000, Mar. 7, 1977, abandoned.

[51] Int. Cl.² .................................................. F24J 3/02
[52] U.S. Cl. ...................................... 126/441; 126/446
[58] Field of Search ............... 126/270, 271, 438, 439, 126/428, 429, 441, 446; 237/1 A; 165/170, 66

[56] References Cited

U.S. PATENT DOCUMENTS

| 201,439 | 3/1878 | Moreau | 126/270 |
|---|---|---|---|
| 2,907,318 | 10/1959 | Awot | 126/271 |
| 3,936,157 | 2/1976 | Kapany | 126/270 |
| 3,964,464 | 6/1976 | Hockman | 126/270 |
| 4,011,856 | 3/1977 | Gallagher | 126/271 |
| 4,016,861 | 4/1977 | Taylor | 126/270 |
| 4,067,319 | 1/1978 | Wasserman | 126/271 |
| 4,073,282 | 2/1978 | Schriefer, Jr. | 126/270 |
| 4,078,544 | 3/1978 | Hollands et al. | 126/270 |
| 4,088,115 | 5/1978 | Powell | 126/270 |
| 4,117,831 | 10/1978 | Bansal et al. | 126/270 X |

*Primary Examiner*—Samuel Scott
*Assistant Examiner*—Randall L. Green
*Attorney, Agent, or Firm*—John Maier, III

[57] ABSTRACT

Heat-absorbing bars having a V-shape are placed parallel to one another in a spaced relationship over a reflective surface. Sunlight strikes the bars on their exposed surface and also off the reflective surface against the underside of the bars. Water tubes may also be used.

9 Claims, 4 Drawing Figures 4,221,209

SOLAR HEAT EXCHANGE PANEL

RELATED APPLICATIONS

This application is a continuation-in-part of abandoned application, Ser. No. 775,000, filed Mar. 7, 1977.

BACKGROUND OF THE INVENTION

A considerable number of solar heat exchange panels presently exist. In a solar heating system, the solar heat exchange panel, which is the heat collecting portion, is exposed to the sun to absorb heat from the rays of the sun. Air is circulated within the heat exchange panel to transfer the heat from the solar heat exchange panel to where the heat can be utilized. Frequently a liquid conduit is also mounted in the solar heat exchange panel to absorb heat which can also be used for various purposes as is the heated air.

This invention relates to improvements in the structure of a solar heat exchange panel and in particular to a solar heat exchange panel of limited size to relationship to the amount of heat that it can absorb. Prior art relating to solar heat exchange panels is as follows:

| Inventor | Patent Number |
|----------|---------------|
| Moreau | 201,439 |
| Awot | 2,907,318 |
| Gallagher | 4,011,856 |
| Taylor | 4,016,861 |

SUMMARY OF THE INVENTION

The present invention provides an improved solar heat exchange panel which efficiently transfers the collected energy by utilizing only a reduced space. The solar heat exchange panel is not only simple and inexpensive to construct but is reduced in size and weight while being capable of a long life and efficient operation.

The novel features which are considered as characteristics of the invention are set forth with particularity in the appended claims. The solar energy collector is located within an insulated enclosure with a metallic casing having a transparent top exposed to the sun with a reflective base below it. Suspended between the transparent top and the reflective base are a series of generally parallel V-shaped heat absorbing bars in a spaced relationship from one another. Directly under the space between the bars is an elongated convex surface, also reflective. Solar rays which pass between the bars impinge against the reflective surface and, in particular, the convex surface and are thereby radiated against the underside of the V-shaped heat collecting bars. A water tube may also be located in the bottom of the trough of the V-shaped bars.

The invention itself, however, as to its construction and obvious advantages will be best understood from the following description of the specific embodiment when read with the accompanying drawings.

DETAILED DESCRIPTION

Although the description hereof is detailed and exact to enable those skilled in the art to practice the invention, the physical embodiments herein disclosed merely exemplify the invention which may be embodied in other specific structures. The scope of the invention is defined in the claims appended hereto.

Figure 1:
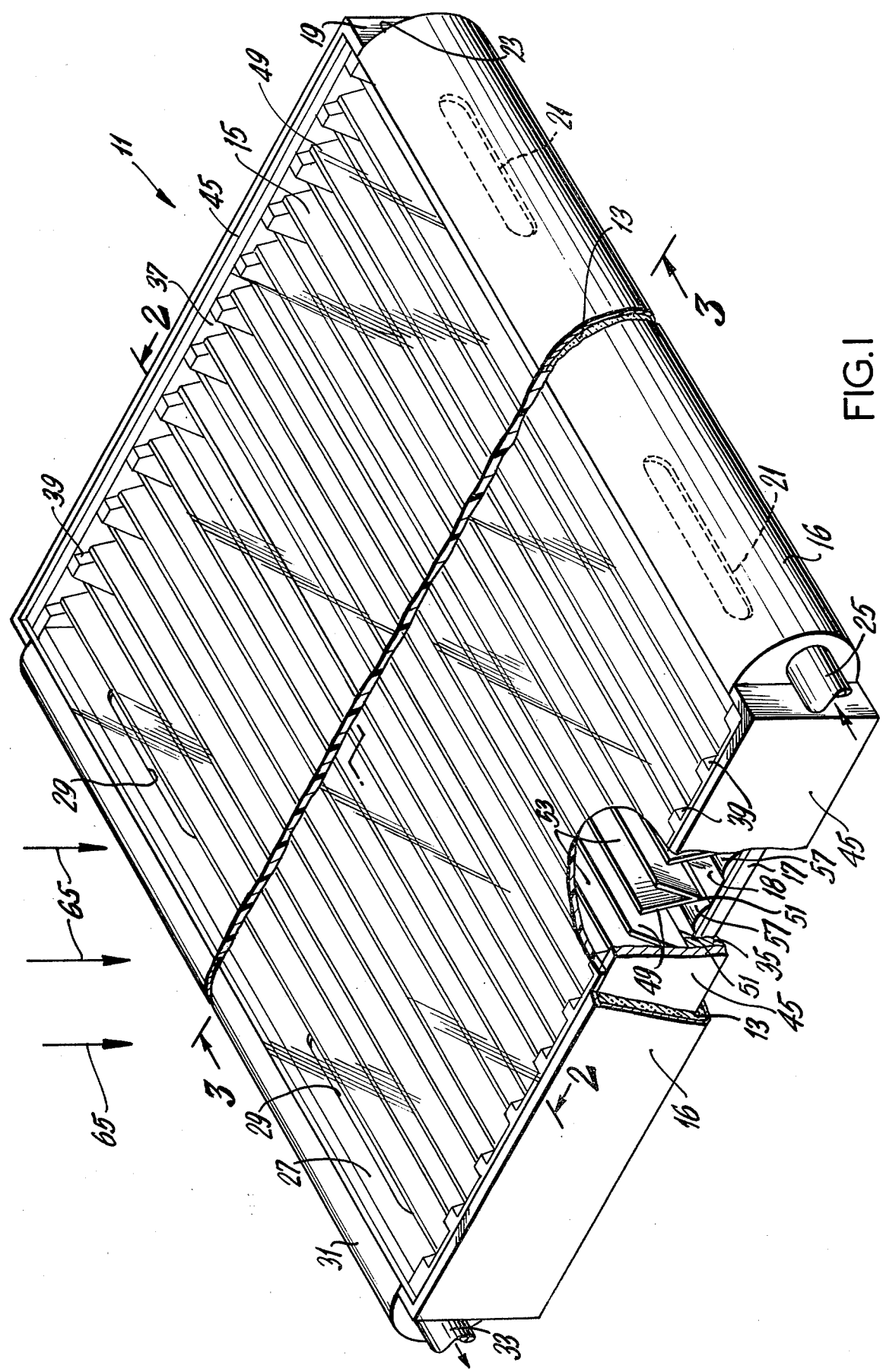
FIG. 1 is a perspective view of the solar panel from the top, lower side and end with portions of the panel broken away.
Figure 2:
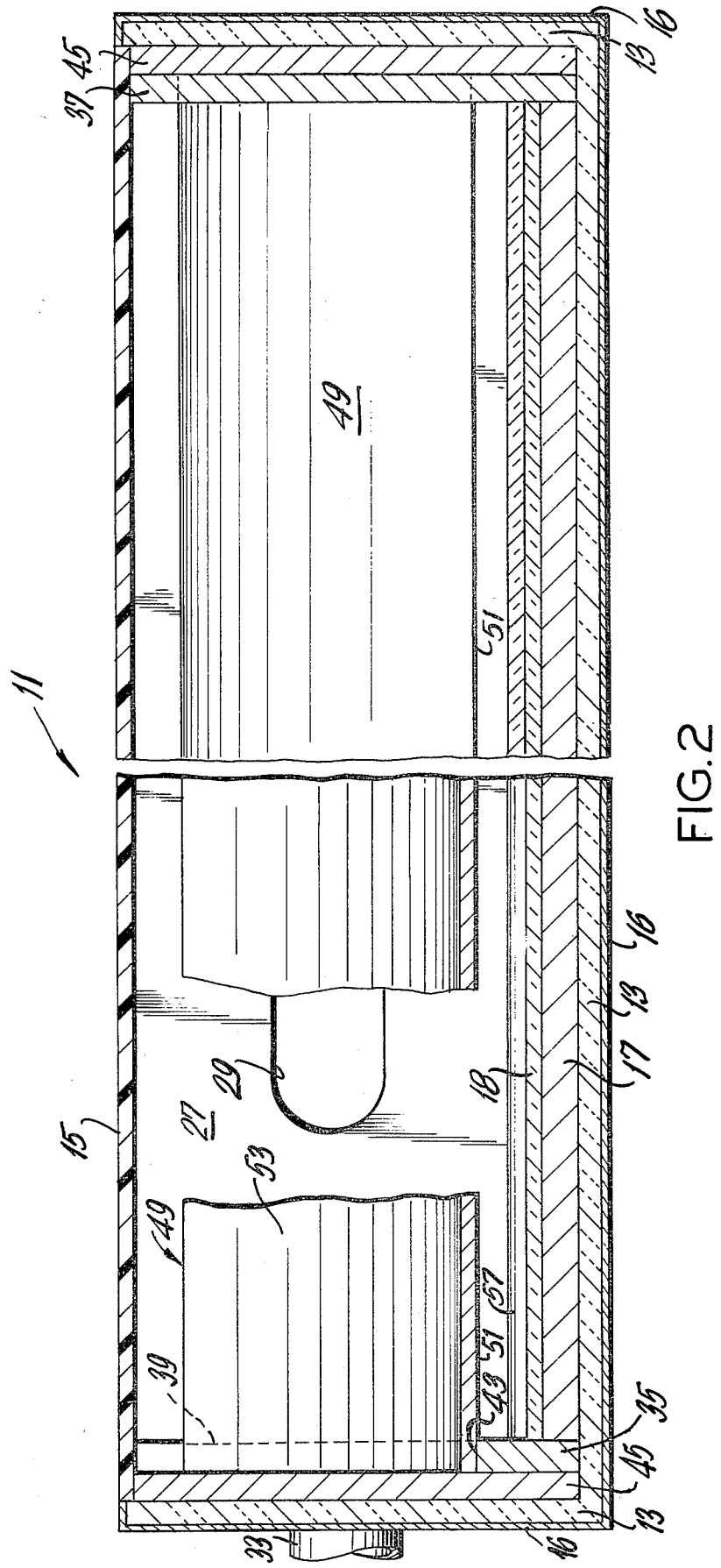
FIG. 2 is a cross-sectional view along lines 2—2 of FIG. 1.

As best seen in FIG. 1, the solar heat exchange panel is encased within a box-like enclosure 11. Insulation 13 surrounds all but the top 15 of the solar heat exchange panel which is transparent, being made of either clear vinyl, plastic or glass. The outside of the insulation 13 is covered by a casing 16 preferably made of either metal or a hard plastic. The bottom 17 lies substantially parallel to the top surface 15. The inner surface 18 of the bottom 17 faces the top surface 15 and is made out of a reflective material, as for example, a mirror or aluminum foil. A lower side 19 is provided with cold air inlets 21 in the form of oval-shaped openings. A lower conduit 23, which has a semi-circular shape extends along the lower side 19 and surrounds the cold air inlets 21 to introduce cold air to the enclosure 11. Cold air is supplied to the lower conduit 23 through an inlet tube 25 connected to the lower conduit 23. An upper side 27, which is parallel to the lower side 19, has outlets located through it, also in the form of oval-shaped openings, for the discharge of heated air. An upper conduit 31, which also has a semi-circular shape, extends along the upper side 27 and encloses the upper side 27 so that the heated air passing through outlets 29 in the upper side 27 enters the upper conduit and is then exited through an outlet tube 33. The two remaining surfaces of the enclosure are the ends 35, 37 which are generally parallel to one another and connect both the upper side 27, the lower side 19 and the bottom 17 and the top 15.

The two ends 35, 37 have V-shaped notches 39 cut in them from adjacent the top 15 downwardly a substantial distance but not the entire distance toward the bottom 17. The top of the V-shaped notches 39 in the two ends 35, 37 may be approximately, by way of example, two and a quarter inches across, and come to an apex 43 about four and half inches deep. The ends 35, 37 may either be partially cut through with the V-shaped notches 39 or may be cut straight through and then have an enclosure barrier 45 placed over the ends 35, 37. The V-shaped notches 39 are spaced from one another adjacent the top 15 a distance substantially smaller than the top of a V-shaped notch 39 itself. By way of example, adjacent notches with a top distance of two and three quarter inches across would only have a distance of about three eighths of an inch between them adjacent the top 15.

The V-shaped bars 49 for collecting heat are located within the V-shaped notches 39 below the top 15, approximately three-quarters of an inch, assuming the dimensions for each notch 39 and its relative spacing is as previously stated. This is also consistent with each V-shaped bar 49 having a side measurement of four inches. The resulting space between the top 15 and the V-shaped bars provides a passageway for the travel of air being heated. Since the V-shaped bars 49 are recessed from the top 15 about three-quarters of an inch within the V-shaped notches 39, the space between the tops of the V-shaped bars 49 is about three-quarters of an inch rather than three-eighths of an inch as exists at the top of the V-shaped notches in the example given. The V-shaped bars 49 are made of a heat absorbing material and are parallel to one another with the apex 51 of the V-shaped bars directed toward the reflective bottom surface 18. In this way, the trough 53 of the V-shaped bars 49 is directed to the top 15 so that the sunlight will strike the troughs 53 directly. The enclosure 11 is sufficiently deeper than the V-shaped notches 39 so that a distance of approximately three-quarters of an inch assuming the earlier-mentioned dimensions is left below the apex 43 of the V-shaped bars 49 to provide for air circulation below the V-shaped bars 49.

Directly below the open space between any two V-shaped bars 49 on the bottom reflective surface 18 are convex strips 57, also made of a reflective material. The V-shaped bars 49 are either black or another absorbent color, such as green on all four surfaces for high heat absorption on all sides, both top and bottom. Sunlight which does not impinge directly upon the troughs 53, passes between the V-shaped bars 49 and is reflected back up by the convex strips 57 and the reflective surface 18 against the underside of the V-shaped bars 49.

Figure 4:
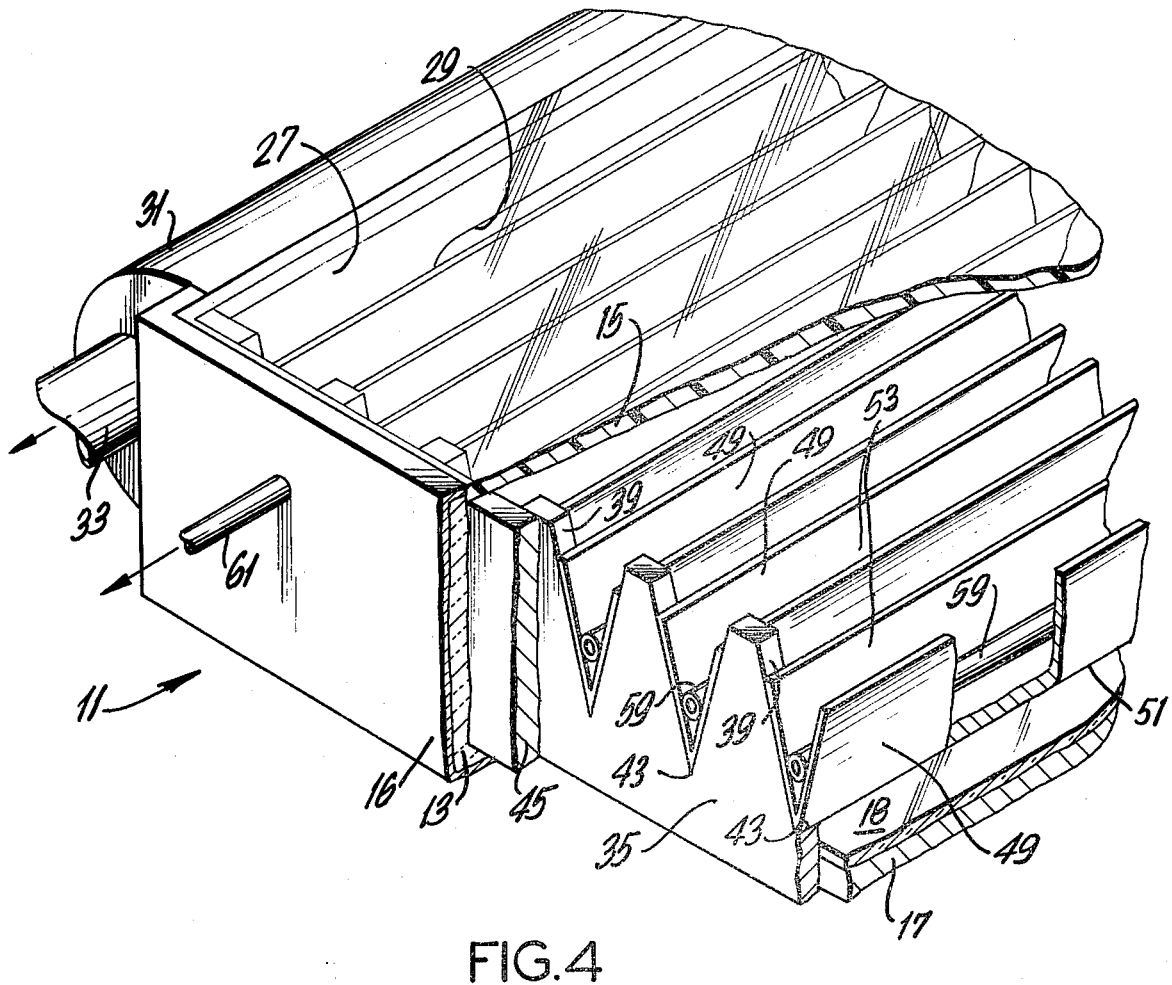
FIG. 4 is a perspective view similar to FIG. 1 but showing a slight modification of the invention.

As best seen in FIG. 4, where heat absorption by a circulating liquid is also to be used, a tube 59 is placed in the bottom of the troughs 53 formed by the V-shaped bars 49 and in physical contact with the V-shaped bars 49 so that heat conduction to the tube 59 will occur. In this way, the sunlight entering through the top 15 will strike the tube 59. A fluid, probably water or a mixture of water and an antifreeze, is circulated through the tube 59 to be heated. An inlet (not shown) is an extension of the tube 59 through either one of the ends 35, 37. An outlet 61 similar to the inlet (not shown) extends through the end 35.

Figure 3:
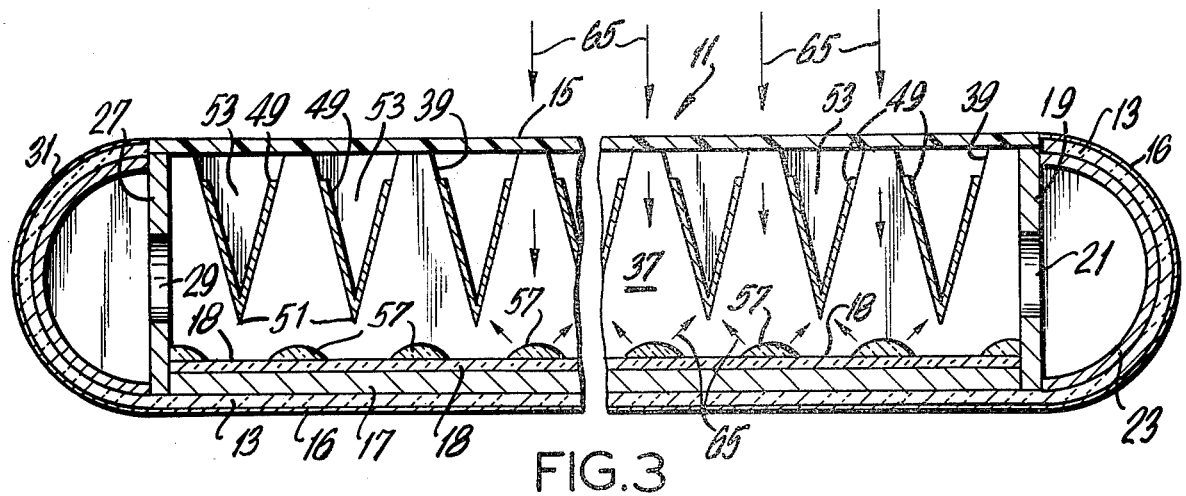
FIG. 3 is a cross-sectional view along lines 3—3 of FIG. 1.

In use, the solar heat exchange panel is placed at an inclined position with the transparent top 15 directed toward the sun. The lower side 19 would thereby be located below the upper side 27 so that air could pass through the enclosure 11 and rise, even by gravity if not by forced circulation, to the upper side 27 and out through the outlet tube 33. The rays of the sun, as indicated by arrows 65, as best seen in FIGS. 1 and 3, enter through the glass or transparent top 15 directly against the V-shaped bars 49 both directly and by reflection as further shown by the arrows 65. As can be readily seen, both sides, top and bottom of the V-shaped heat absorbing bars 49 are used. Assuming an enclosure 11 approximately four feet by eight feet, with eight foot long V-shaped bars 49 placed therein, fifteen to sixteen of the bars 49 would be possible, resulting in approximately a five to one increase in available surface for heat absorption over a panel utilizing only the top surface of its heat absorbing units.

The invention may be embodied in other specific forms without departing from the spirit or essential characteristics thereof. The present embodiments are, therefore, to be considered in all aspects as illustrative and not restrictive. The scope of the invention being indicated by the appended claims rather than the foregoing description and all changes which come within the meaning of range of equivalency of the claims are therefore, intended to be embraced therein:

I claim:

1. A solar heat exchanger panel comprising:
   a plurality of bars, each bar being V-shaped with an apex and a trough and being adapted to absorb heat on all surfaces, said bars being located in a common plane and in a spaced relationship to one another forming spaces between the bars;
   an enclosure means having a transparent top and a reflective bottom surface within said enclosure means, said reflective bottom surface generally facing said transparent top, said bars being supported by said enclosure means in a spaced relationship with both said transparent top and said reflective bottom surface, with the apex of each of the plurality of bars pointed toward the reflective surface and the trough of said plurality of bars open toward the transparent top, the space between each of the plurality of bars being less than the space across the top of each trough, said reflective bottom surface including a plurality of convex strips located directly below the spaces between the plurality of bars;
   inlet means partially coextensive with said enclosure means for supplying cold air into said enclosure means and across said plurality of bars; and
   outlet means partially coextensive with said enclosure means for discharging heated air from said enclosure.

2. A solar heat exchanger according to claim 1 wherein:
   said enclosure means includes a lower side and an upper side substantially parallel to one another and two ends substantially parallel to one another; and
   said inlet means is connected to said lower side and said outlet means is connected to said upper side.

3. A solar heat exchanger panel according to claim 2 wherein said plurality of bars extend between said two ends and are supported within said enclosure means by said two ends, said plurality of bars being substantially parallel to said lower side and said upper side.

4. A solar heat exchanger panel according to claim 1 further including a tube within the enclosure means for circulating a heat absorbing liquid, said tube having an inlet means and an outlet means.

5. A solar heat exchanger panel according to claim 3 further including a tube located within the trough of said plurality of bars, said tube having an inlet means and an outlet means.

6. A solar heat exchanger panel according to claim 1 wherein said plurality of bars are black on all surfaces.

7. A solar heat exchanger panel according to claim 1 wherein said plurality of bars are green on all surfaces.

8. A solar heat exchange panel comprising:
   a plurality of bars, each bar being V-shaped with an apex and a trough and being adapted to absorb heat on all surfaces, said bars being located in a common plane and in a spaced relationship to one another forming spaces between the bars;
   an enclosure means having a transparent top and a reflective bottom surface within said enclosure means, said reflective bottom surface generally facing said transparent top, said bars being supported by said enclosure means in a spaced relationship with both said transparent top and said reflective bottom surface, with the apex of each of the plurality of bars pointed toward the reflective surface and the trough of each of said plurality of bars open toward the transparent top, the space between each of the plurality of bars being less than the space across the top of each trough, said reflective bottom surface including a plurality of convex strips located directly below the spaces between the plurality of bars, said enclosure having an upper side and a lower side and two ends, each of said two ends having V-shaped notches therein adapted to receive the ends of said bars, said bars being supported in said V-shaped notches;

a lower semi-circular conduit attached to the lower side of said enclosure means, said lower side of said enclosure means having an opening therein; said lower semi-circular conduit having an inlet means to supply cold air through said opening in said lower side into said enclosure means; and an upper semi-circular conduit attached to the upper side of said enclosure means, said upper side of said enclosure means having an opening therein, said upper semi-circular conduit having an outlet means to exhaust heated air through said opening in said upper side from said enclosure means.

9. A solar heat exchange panel according to claim 8 further including a tube within the enclosure means for circulating a heat absorbing liquid, said tube having an inlet means and an outlet means.

* * * * *